United States Patent
Utsch

(10) Patent No.: US 9,321,541 B2
(45) Date of Patent: Apr. 26, 2016

(54) METHOD FOR LANDING AN AIRSHIP ON A LANDING DEVICE PLACED ON THE GROUND

(71) Applicant: DATANION GMBH, Wilnsdorf (DE)

(72) Inventor: Gerold Utsch, Wilnsdorf (DE)

(73) Assignee: DATANION GMBH, Wilnsdorf (DE)

( * ) Notice: Subject to any disclaimer, the term of this patent is extended or adjusted under 35 U.S.C. 154(b) by 171 days.

(21) Appl. No.: 14/362,207

(22) PCT Filed: Nov. 29, 2012

(86) PCT No.: PCT/EP2012/073939
§ 371 (c)(1),
(2) Date: Jun. 2, 2014

(87) PCT Pub. No.: WO2013/079583
PCT Pub. Date: Jun. 6, 2013

(65) Prior Publication Data
US 2014/0284423 A1    Sep. 25, 2014

(30) Foreign Application Priority Data
Dec. 2, 2011   (DE) .................. 10 2011 119 979

(51) Int. Cl.
| | | |
|---|---|---|
| *B64B 1/66* | (2006.01) | |
| *B64F 1/02* | (2006.01) | |
| *B64F 1/14* | (2006.01) | |
| *B64F 1/22* | (2006.01) | |
| *B64F 1/12* | (2006.01) | |

(52) U.S. Cl.
CPC ... *B64F 1/02* (2013.01); *B64B 1/66* (2013.01); *B64F 1/12* (2013.01); *B64F 1/14* (2013.01); *B64F 1/22* (2013.01)

(58) Field of Classification Search
CPC ............... B64F 1/02; B64F 1/12; B64F 1/14; B64F 1/22; B64B 1/66
USPC ........................................................... 244/115
See application file for complete search history.

(56) References Cited

U.S. PATENT DOCUMENTS

| | | | |
|---|---|---|---|
| 1,522,956 A | 1/1925 | Jaray | |
| 4,085,912 A * | 4/1978 | Slater | B64B 1/38 244/115 |
| 4,238,095 A * | 12/1980 | Slater | H01F 7/04 244/115 |
| 4,272,042 A * | 6/1981 | Slater | B64B 1/38 244/115 |
| 5,431,359 A * | 7/1995 | Belie | B64B 1/66 244/116 |
| 6,328,257 B1 * | 12/2001 | Schafer | B64B 1/06 244/24 |

FOREIGN PATENT DOCUMENTS

| | | |
|---|---|---|
| GB | 333164 A | 8/1930 |
| GB | 2369809 A | 6/2002 |

* cited by examiner

*Primary Examiner* — Justin Benedik
(74) *Attorney, Agent, or Firm* — Maier & Maier, PLLC

(57) ABSTRACT

A method for landing an airship on a landing device placed on the ground by: aligning, in particular horizontally aligning, the airship relative to the landing device with the aid of driving mechanisms arranged on the airship; lowering the airship onto a landing platform element of the landing device; arresting the airship on the landing platform element, wherein at least one electric magnet arranged in the landing device magnetically pulls the airship towards the landing device; and fastening the airship to the ground.

9 Claims, 4 Drawing Sheets

METHOD FOR LANDING AN AIRSHIP ON A LANDING DEVICE PLACED ON THE GROUND

Figure 1:
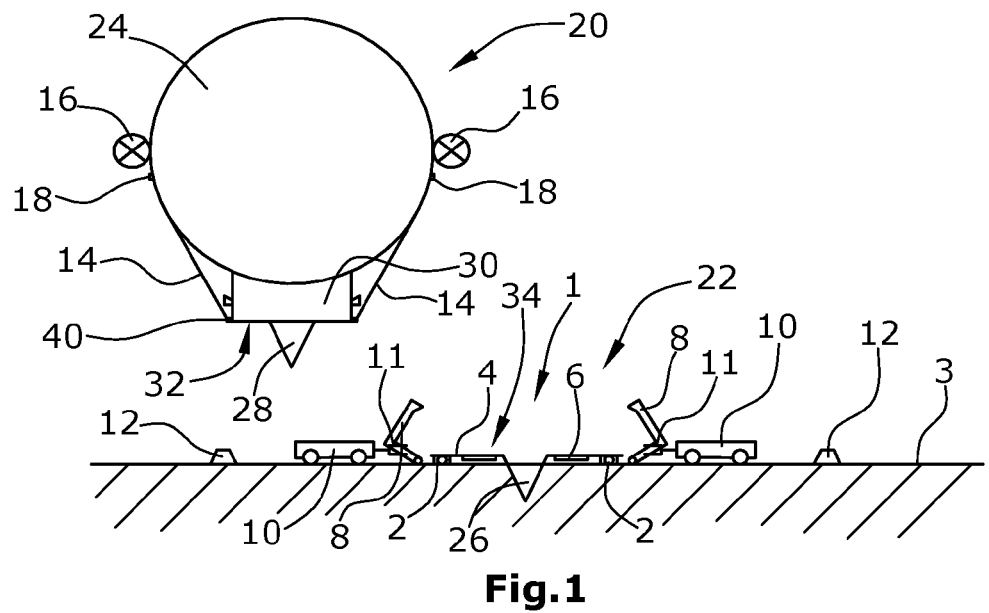

The invention relates to a method for landing an airship on a landing device placed on the ground and to a guiding means for landing an airship on the landing device.

Airships are dirigible aircraft whose lift is based on aerostatic forces and which have a drive of their own. However, the landing of such airships and the subsequent mooring pose problems. Presently, a large crew of helpers is needed on the ground that haul the airship to a mooring mast or into a hangar pulling on ropes fastened to the airships.

It is an object of the invention to simplify the landing operation of an airship.

The invention advantageously provides that a method for landing an airship on a landing device placed on the ground comprises the following steps:
  alignment, in particular horizontal alignment of the airship relative to the landing device with the aid of driving mechanisms arranged on the airship;
  lowering of the airship onto a landing platform element of the landing device;
  arresting the airship on the landing platform element, wherein at least one electric magnet arranged in the landing device magnetically pulls the airship towards the landing device;
  fastening of the airship to the ground.

It is an advantage of the method that it can be practiced without a large crew of helpers, since the electric magnet effects the short-term arresting of the airship on the landing platform element.

The airship can be fastened to the ground by means of rope elements and/or retaining gripping elements.

After the airship has been arrested on the landing platform element at least by means of the electric magnet, the landing platform element of the landing device can be rotated relative to a ground element of the landing device arranged on the ground. Thereby, also the airship can be rotated relative to the ground element.

The airship can comprise fastening means for fastening the rope elements to the airship and the landing device may comprise ground fastening means for fastening the rope elements to the ground, wherein the fastening elements of the airship can be turned such that the fastening means on the airship are aligned with the fastening means on the ground.

The fastening means on the airship can be turned by turning the landing platform element relative to the ground element and by turning, along with the landing platform element, the airship arrested on the landing platform element by means of the electric magnet.

As an alternative, the fastening means on the airship can be arranged on a turntable, wherein, after the airship has been arrested on the landing platform element at least by means of the electric magnet, the turntable can be turned relative to a ground element of the landing device arranged on the ground. The turntable can be turned relative to the ground element arranged on the ground, such that the fastening means on the airship are aligned with the fastening means on the ground. In this embodiment, the airship itself is not turned relative to the ground element.

After the airship has been arrested on the landing platform element by means of the electric magnet and preferably after the fastening means arranged on the airship have been aligned with the fastening means on the ground, the airship can be fastened on the ground by means of retaining gripper elements. The retaining gripper elements may be elements that are fastened on the ground and can engage into hooking elements on the nacelle of the airship to thereby fasten the airship on the ground.

In addition or as an alternative, the airship can be fastened on the ground by means of rope elements.

In order to fasten the airship by means of rope elements, the rope elements fastened to the airship can be detached and be gripped by at least one gripper arm of at least one ground vehicle and be transferred to the ground fastening means, where they can be fixed. Thus, an additional reduction of ground personnel can be achieved.

The at least one gripper arm of the at least one ground vehicle and/or the at least one ground vehicle can be controlled automatically.

After the airship has been fastened on the ground using the rope elements and/or the retaining gripper elements, the at least one electric magnet can be deactivated.

The alignment and the lowering can be controlled by means of a control device, preferably in an automatic manner.

The control device does not have to be arranged in the airship. The airship can be remote-controlled from the ground by means of the control device.

The lowering and the alignment can be controlled at least in dependence on the position if the airship relative to the platform and to the speed of the airship.

Further, the lowering and the alignment can be controlled in dependence on the wind velocity.

When landing, the airship can be guided mechanically by means of a guiding means, wherein the guiding means comprises at least one tapering recess on the airship or in the landing device and, provided on the airship or on the landing device, at least one insertion element adapted to the shape of the recess, wherein, upon landing, the insertion element is inserted into the recess, whereby the airship is guided during landing.

During the horizontal alignment, the airship can be aligned such that at least the end of the protruding guiding element, averted from the airship or the landing device, is arranged above or below the recess in the vertical direction.

When arresting the airship or in the arrested state of the airship on the landing device, the engines can be operated such that they exert a force on the airship that acts in the direction of the landing device, wherein the force arresting the airship on the landing device is augmented by means of the engines. Further, when arresting the airship or in the arrested state of the airship on the landing device, the engines can be operated such that they exert a force on the airship that compensates the wind force acting on the airship.

In a state fastened on the ground by means of the retaining gripper elements and/or the rope elements, the engines can be operated such that they exert a force on the airship that acts in the direction of the landing device or the ground, wherein the force fastening the airship on the ground is augmented by the engines. Further, in a state fastened on the ground by means of the retaining gripper elements and/or the rope elements, the engines can be operated such that they exert a force on the airship that compensates the wind force acting on the airship.

According to the present invention, it is further possible to provide a guiding means of an airship and a landing device for guiding the airship during the landing on the landing device, wherein the airship comprises a nacelle with a bottom surface and the landing device comprises a platform with a landing surface, wherein the airship lands with the bottom surface of the nacelle on the landing surface of the platform. In the landing surface, the platform comprises a tapering recess and the nacelle has an insertion element adapted to the shape of the recess and projecting relative to the bottom surface of the nacelle, wherein the insertion element can be inserted into the recess when the airship lands on the landing surface and the airship can be guided to a predetermined landing position on the landing device.

As an alternative, the nacelle can have a tapering recess in the bottom surface and the platform can have an insertion element adapted to the shape of the recess and protruding with respect to the landing surface of the platform, wherein the insertion element can be inserted into the recess when the airship is landing and the airship can be guided to a predetermined landing position on the landing device.

The tapering recess and the insertion element adapted to the shape of the tapering recess may be conical.

The present invention further provides a landing device for an airship. The landing device comprises a platform that includes at least a ground element to be placed on the ground and a landing platform element with a landing surface, the landing surface being suited as a landing place for the airship, wherein the platform comprises at least one electric magnet, wherein the airship which has landed on the landing platform element can be magnetically arrested on the landing platform element by means of the electric magnet.

The landing platform element can be rotatable about a rotary axis with respect to the ground element, wherein the rotary axis preferably extends orthogonally to the landing surface.

The platform can have a tapering recess in the landing surface, wherein an insertion element adapted to the shape of the recess and projecting with respect to the bottom surface of the nacelle can be inserted into the recess when the airship lands on the landing surface and the airship can be guided to a predetermined landing position on the landing device.

The platform can comprise an insertion element protruding relative to the landing surface and tapering towards the end averted from the landing surface, wherein, when the airship lands on the landing surface, the insertion element can be inserted into a tapering recess adapted to the shape of the protruding insertion element and provided in the bottom surface of the nacelle, and the airship can be guided to a predetermined landing position on the landing device.

The landing platform can be adapted to be turned electrically, mechanically, hydraulically or pneumatically relative to the ground element.

Ground fastening means can be arranged concentrically with respect to the platform, to which rope elements can be fastened that are provided on the airship.

Retaining gripper elements can be arranged concentrically with respect to the platform, by which the airship can be fastened on the ground.

The following is a detailed description of the present invention with reference to embodiments.

Figure 2:
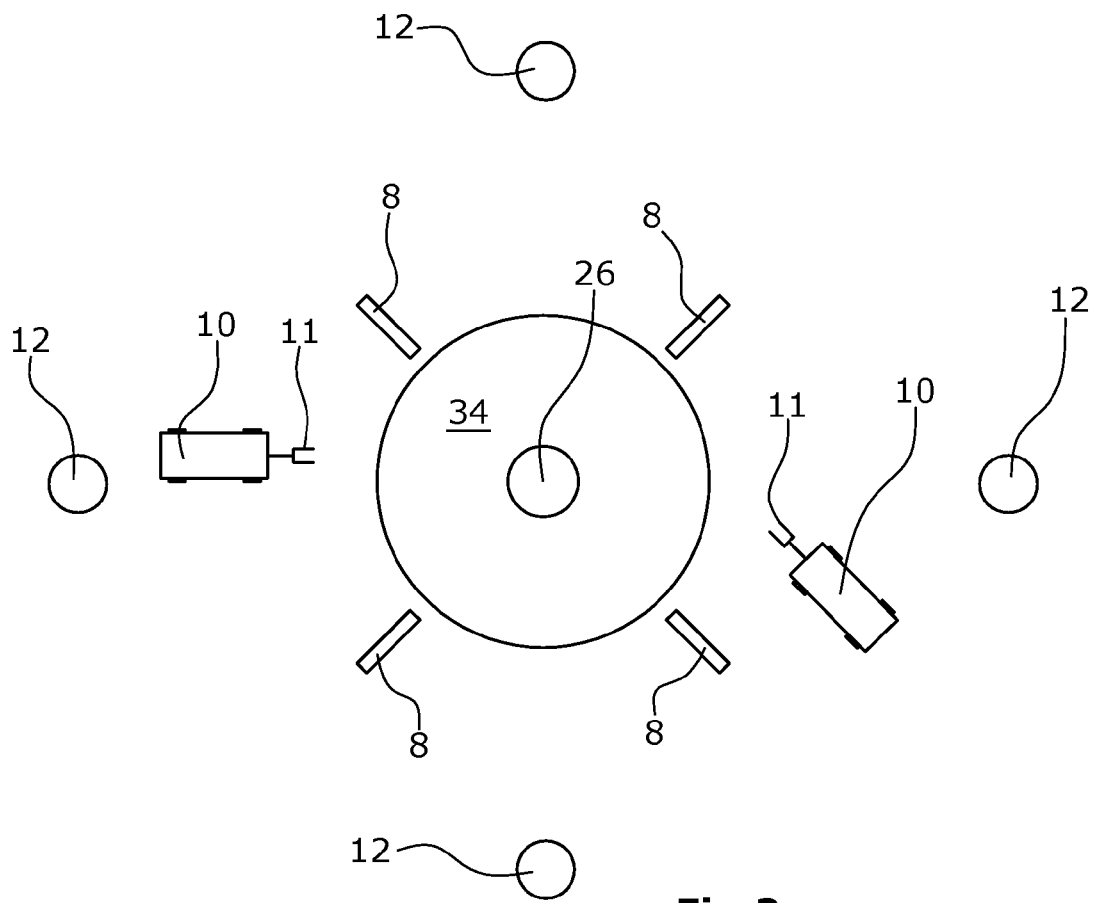
Figure 3:
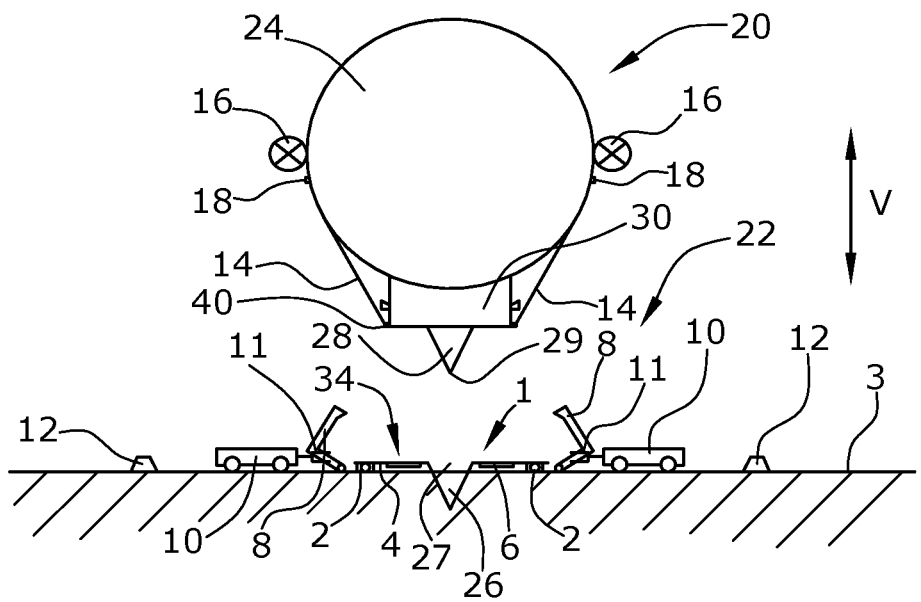
Figure 4:
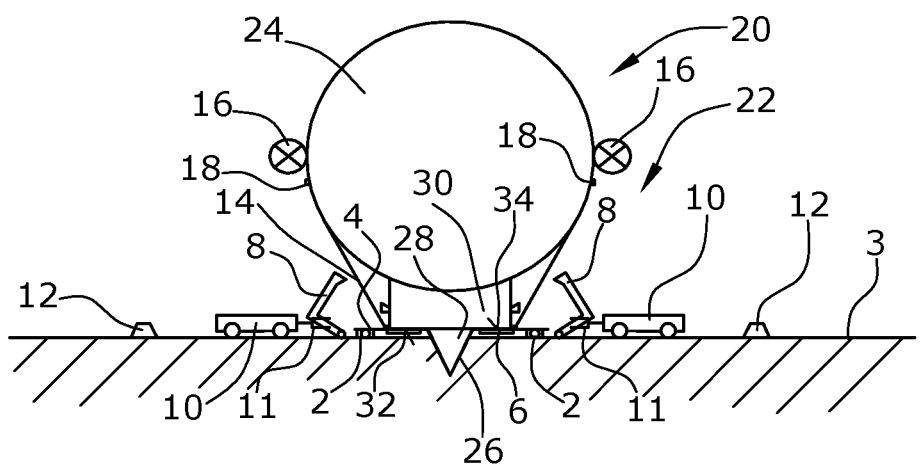
Figure 5:
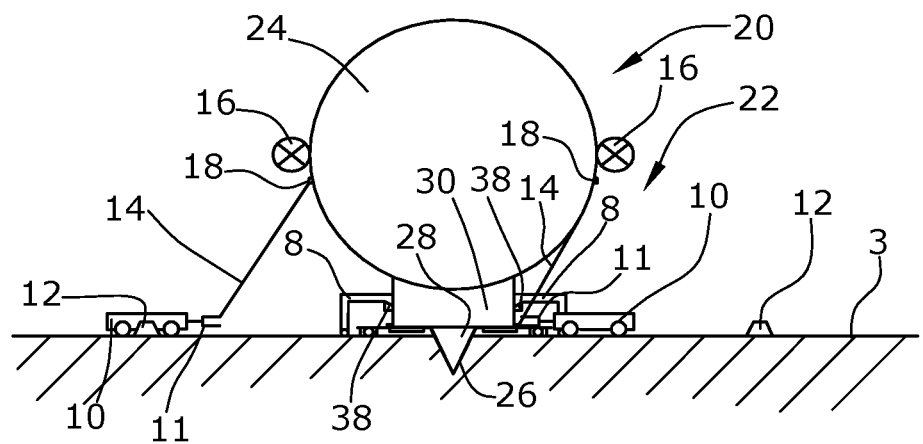
Figure 6:
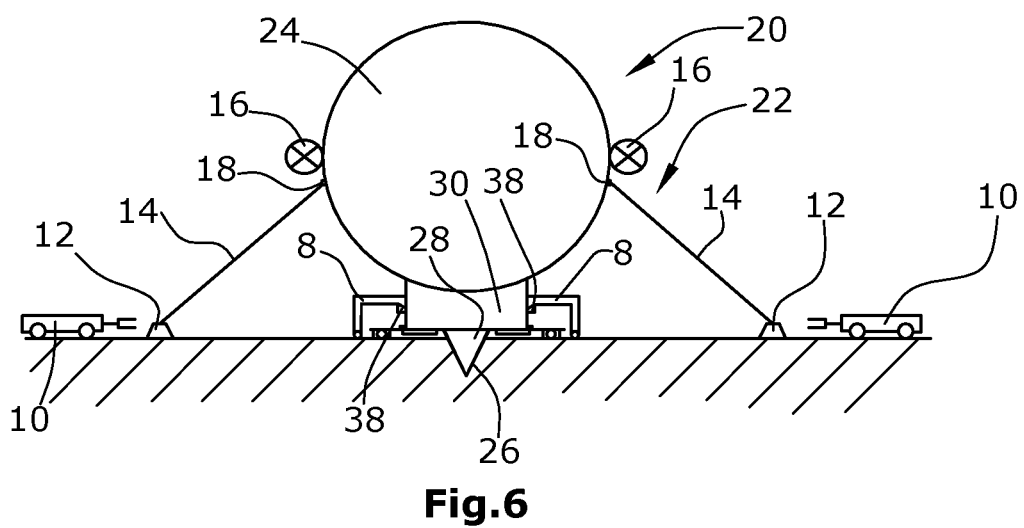
Figure 7:
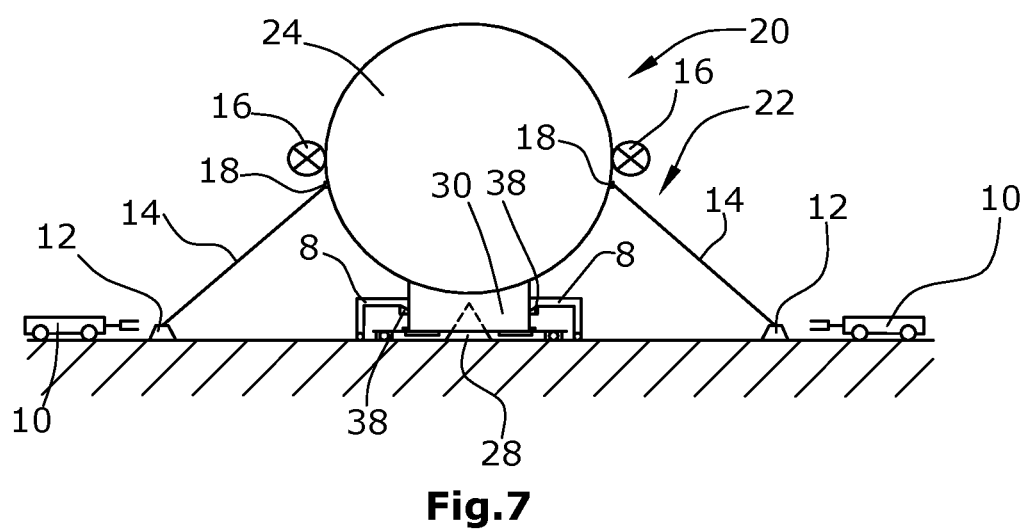

The drawings schematically show:

FIG. 1 an airship 20 and a landing device 22 for such an airship;

FIG. 2 the landing device of FIG. 1 in top plan view;

FIG. 3 an airship aligned above the landing device;

FIG. 4 an airship that has landed on the landing device;

FIG. 5 an airship arrested for a short time;

FIG. 6 the airship fastened on the ground by means of rope elements;

FIG. 7 an airship and a landing device with an alternative guiding means.

FIG. 1 shows an airship 20. An airship 20 is a dirigible aircraft whose lift is based on aerostatic forces and which has a drive of its own. The airship 20 comprises a lifting body 24. In the present case this lifting body is preferably balloon-shaped. The airship 20 further comprises a nacelle 30 and engines 16. The nacelle 30 has a bottom surface 32 and an insertion element 28 protruding relative to the bottom surface 32. The engines 16 are arranged on the airship 20 for pivotable movement such that the airship 20 is dirigible by pivoting the engines.

FIG. 1 further illustrates a landing device 22 for the airship 20. The landing device 22 comprises a platform 1. The platform 1 has a ground element 2 placed on the ground. Preferably, this ground element 2 is anchored in the ground 3. Further, the platform 1 comprises a landing platform element 4 that can be turned relative to the ground element 2. The landing platform element 4 can be rotated magnetically, electrically, hydraulically, mechanically and/or pneumatically relative to the ground element 2. The Figures illustrate roller elements by which the landing platform element can be rotated relative to the ground element. The platform 1 comprises electric magnets 6. FIG. 1 illustrates an example in which the landing platform element 4 comprises the electric magnets 6.

The landing platform element 4 has a landing surface 34 on which the airship 20 can land. The landing surface 34 comprises a tapering recess 26. The airship 20 preferably lands on the landing surface 34 of the platform 1 with the bottom surface 32 of the nacelle 30.

Further, the landing device 22 comprises retaining gripper elements 8 fastened to the ground 3 and pivotable relative thereto. The function of the retaining gripper elements 8 will be described in more detail further below.

Moreover, the landing device 22 illustrated in FIG. 1 includes ground vehicles 10 having gripper arms 11. Although not illustrated in the Figure, the ground vehicles 10 can move on rails. The function of the ground vehicles 10 having the gripper arms 11 will be described in more detail with reference to the following Figures.

Further, the landing device 22 comprises fastening means 12 to which the rope elements 14 of the airship can be fastened.

In FIG. 2, the landing device 22 is shown in top plan view. In this top plan view, the landing surface 34, the tapering recess 26 and the retaining gripper elements 8, the ground vehicles 10 with the gripper arms 11 and the ground fastening means 12 can be seen.

FIG. 3 illustrates how the airship 20 is positioned relative to the landing device 22, preferably in a horizontal direction, using the engines 16. The airship 20 is positioned in a horizontal direction preferably such that at least the end 29 of the protruding insertion element 28 averted from the bottom surface 32 of the nacelle 30 is arranged, seen in the vertical direction V, above the opening 27 of the recess 26 in the platform 1. The insertion element 28 at the nacelle 30 and the tapering recess 26 in the platform 1, the form of the insertion element 28 at the airship 20 being adapted to the shape of the recess 26.

The insertion has the advantage that, if the airship 20 cannot be landed exactly on the landing device 22, the airship 20 can still be positioned very precisely on the platform 1 or the landing surface 34, respectively, by means of the insertion element. As long as the end 29 of the insertion elements 28 is arranged vertically above the opening 27 of the recess 26, the insertion element 28 is inserted into the recess 26 when being lowered down onto the landing surface 34. Owing to the fact that the recess 26 is tapering and the insertion element 28 is adapted to the tapering recess 26, the airship 20 is guided to a predetermined landing position on the landing device 22 while the insertion element 28 is inserted into the recess 26. Preferably, the recess is conical.

The vertical direction refers to a direction orthogonal to the ground surface 3 or the landing surface 34, respectively.

In the next step of the landing operation, the airship 20 is lowered onto the landing device 22. For the lowering, the engines 16 are used preferably, the engines preferably being pivoted such that they exert a vertical force on the airship 20 that is directed towards the ground surface. If a plurality of engines 16 exists, some engines 16 can be used for the vertical alignment and some can be used for the horizontal alignment of the airship 20. The horizontal alignment is directed in a direction H that preferably extends parallel to the ground surface 3 or parallel to the landing surface 34.

In addition or as an alternative, it is also possible to discharge propellant gas in order to lower the airship 20. Further, when the airship 20 is lowered onto the landing device 22, the electric magnets 6 can be activated which exert a magnetic force of attraction on the airship 20. For this to be realized, the airship 20 has a magnetically attractable element. The same is preferably arranged in the bottom surface 32 of the nacelle 30. The magnetically attractable element preferably is a metal element. Thus, it is possible to additionally exert a force on the airship 20 by means of the electric magnets 6 that acts towards the landing device 22 or the ground 3.

FIG. 4 shows that the airship 20 has already landed on the landing device 22. The insertion element 28 protruding with respect to the bottom surface 32 of the nacelle 30 is fully inserted into the tapering recess 26. The bottom surface 32 of the nacelle is placed on the landing surface 34. In this position, the airship 20 is arrested at least temporarily on the landing platform element 4 by means of the electric magnets 6. It is possible to arrest the airship 20 on the platform 1 only through the force exerted o the airship 20 by means of the electric magnets 6.

Moreover, the engines 16 or some of the engines 16 can be pivoted such that they exert a force on the airship that acts in the direction of the landing surface 34 or the ground. In this case, the airship 20 can be arrested on the landing platform element 4 both by means of the force acting on the airship 20 due to the electric magnets 6 and by means of the force acting on the airship 20 due to the pivoted engines 20.

The engines 16 or some of the engines 16 can also be pivoted such that they exert a force on the airship 20 that counteracts the wind force acting on the airship 20 and preferably compensates the wind force. Further, some of the engines 16 can be pivoted such that they exert a force on the airship 20 that is directed towards the landing surface 34 or the ground 3, and other engines 16 can be pivoted such that they exert a force on the airship 20 that counteracts the wind force acting on the airship 20 and preferably compensates the wind force.

After the airship 20 has been arrested, the landing platform element 4 can be turned relative to the ground element 2. Thus, the airship 20 is turned relative to the ground 3 together with the landing platform element 4. The landing platform element 4 is preferably turned such that the fastening means 18 on the airship 20 are aligned with respect to the ground fastening means 12 on the ground, where aligned means that the distance between the fastening means 18 of the airship 20 positioned on the platform 1 and the ground fastening means 12 is the smallest possible distance.

As an alternative, instead of turning the landing platform element 4, it is possible to turn the fastening means 18 along the airship 20 about a rotary axis extending orthogonally to the ground surface 3 or the landing surface 34. In this manner, it is not necessary to turn the entire airship 20. For example, the fastening means 18 on the airship 20 can be mounted on a turntable adapted to be turned relative to the airship 20 standing stationarily on the ground.

As illustrated in FIG. 5, the airship 20 can be fixed in the turned position by means of retaining gripper elements 8. The retaining gripper elements engage hooking elements 38 fastened on the nacelle 30. Further, in the state in which the airship is fixed on the ground by means of the retaining gripper elements 8, the engines 16 or some of the engines 16 can be pivoted such that they exert a force on the airship 20 that acts in the direction of the landing surface 24 or the ground 3. Thus, the force retaining the airship on the ground can be increased. As an alternative or in addition, in the state in which the airship is fixed on the ground by means of the retaining gripper elements 8, the engines 16 or some of the engines 16 can also be pivoted such that they exert a force on the airship 20 which counteracts the wind force acting on the airship 20 and preferably compensates the wind force.

In the state fixed on the ground by means of the retaining gripper elements 8, the electric magnets 6 can be deactivated. In particular, the electromagnets 6 can be deactivated if a force exerted by the engines 16 acts additionally on the airship, the force acting in the direction of the landing surface 34 or the ground, and/or a force acts on the airship through the engines that counteracts the wind force acting on the airship 20 and preferably compensates the wind force.

Subsequently, the rope elements 14 are detached from the detachable fastening means 40. The detachable fastening means 40 are preferably mechanical fastening means. The gripper arms 11 of the ground vehicles 10 can detach the rope elements 14 fastening elements 40. The ground vehicles 10 transfer the ends of the rope elements 14 to the ground fastening means 12.

FIG. 6 illustrates the step of the landing operation in which the rope elements 14 fastened to the airship are fastened to the ground fastening means 12 and the airship 20 is thereby fastened on the ground. After the fastening by means of the rope elements 14, the electric magnets 6 can be deactivated.

The step of fixing o the ground 3 by means of the rope elements 14 can be omitted and the airship 20 may be fixed on the ground merely by the retaining gripper elements 8 and in addition by means of the engines 16, if needed. This is done preferably, if the airship 20 is to stay on the ground only for a short time. If the airship 20 is to stay on the ground for a longer time, the airship 20 is fastened on the ground 3 preferably by means of rope elements 14. As an alternative, the fixation by means of the retaining gripper elements 8 can also be omitted, and a fixation on the ground 3 merely by means of rope elements 14 may be realized.

Preferably, the ground vehicles 10 can be steered automatically. Likewise, the gripper arms 11 of the ground vehicles 10 are automatically steerable. The ground vehicles 10 can also move on rails that are not illustrated in the Figures.

In the state fastened on the landing device 22, the airship 20 can be supplied with fuel, propellant gas or electric energy or ballast. This can also be done in an automated manner.

Aligning and lowering the airship 20 can be effected by means of a control device. The control device preferably receives measured values from sensors, which values may refer to the exact position of the airship 20, the given speed of the wind, and the exact position of the landing device 22. Using these measured values, the airship 20 can be aligned horizontally above the landing device 22 and be lowered. If the electric magnets 6 are activated, the force of the electric magnets 6 can also be included in the control during the lowering operation.

Preferably, the control device is not arranged in the airship. The airship 20 can be remote-controlled by a person using the control device. The control device can be arranged, for example, on the ground 3 or in another flying object that is in the vicinity of the airship 20.

As an alternative, the control device can be operated automatically. For example, velocity ranges are entered defining the minimum and maximum velocities at which the airship shall move, and it is possible to indicate the velocity at which the airship 20 shall approach the landing device 22. Further, the wind speed and/or the inertia can be taken into account. Further, it is possible to indicate that the airship 20 is first to be positioned such that the end 20 of the insertion element 28 is situated vertically above the opening 27 of the recess 26. Only thereafter will the airship 20 be lowered, with the airship being lowered only as long as the end 29 of the insertion element 28 is located vertically above the opening 27 of the recess 26.

FIG. 7 illustrates an embodiment in which the recess 26 is provided in the nacelle 34 and the insertion element is provided on the platform 1.

The invention claimed is:

1. A method for landing and guiding an airship on a landing device placed on the ground, comprising:
   aligning, in particular horizontally aligning, the airship relative to the landing device using of driving mechanisms arranged on the airship;
   lowering the airship onto a landing platform element of the landing device;
   arresting the airship on the landing platform element, including using at least one electric magnet arranged in the landing device to magnetically pull the airship towards the landing device, wherein, during landing, the airship is guided mechanically by a guiding device, the guiding device having at least a tapering recess provided in the airship or the landing device and, provided at the airship or the landing device, at least an insertion element adapted to the shape of the recess, wherein, during landing, the insertion element is inserted into the recess, whereby the airship is guided during landing; and
   fastening the airship to the ground.

2. The method of claim 1, wherein the airship is fastened on the ground by rope elements and/or retaining gripper elements.

3. The method of claim 2, wherein the airship has fastening elements useable to fasten the rope elements to the airship, and the landing device has ground fastening devices useable to fasten the rope elements to the ground, wherein the fastening elements at the airship ground are turned such that the fastening elements on the airship are aligned with the ground fastening devices.

4. The method of claim 1, wherein, after the airship has been arrested on the landing platform element at least by the electric magnet, the landing platform element of the landing device is turned with respect to a ground element of the landing device placed on the ground.

5. The method of claim 3, wherein the fastening elements on the airship are mounted on a turntable on the airship, and wherein, after the airship has been arrested on the landing platform element at least by means of the electric magnet, the turntable is turned relative to a ground element of the landing device placed on the ground.

6. A system for landing and guiding an airship on a landing device, comprising:
   a platform on the landing device that includes at least a ground element to be placed on the ground and a landing platform element with a landing surface, the landing surface being suited as a landing place for the airship,
   a nacelle on the airship with a bottom surface, the airship being intended to land with the bottom surface of the nacelle on the landing surface of the platform;
   a tapering recess included on the bottom surface of the nacelle;
   an insertion element on the platform, the insertion element adapted to the shape of the tapering recess and projecting relative to the landing surface of the platform, wherein the insertion element is configured to be inserted into the recess when the airship lands on the landing surface and the airship configured to be guided to a predetermined landing position on the landing device; and
   at least one electric magnet on the platform, wherein the airship is configured to be magnetically arrested on the landing platform element by actuation of the electric magnet.

7. The landing device of claim 6, wherein the landing platform element is rotatable about a rotary axis relative to the ground element.

8. A system for landing and guiding an airship on a landing device, comprising:
   a platform on the landing device that includes at least a ground element to be placed on the ground and a landing platform element with a landing surface, the landing surface being suited as a landing place for the airship;
   a nacelle on the airship with a bottom surface, the airship being intended to land with the bottom surface of the nacelle on the landing surface of the platform;
   a tapering recess in the landing surface of the platform;
   an insertion element in the nacelle, the insertion element adapted to the shape of the tapering recess and projecting relative to the bottom surface of the nacelle, wherein the insertion element is configured to be inserted into the recess when the airship lands on the landing surface and the airship is configured to be guided to a predetermined landing position on the landing device; and
   at least one electric magnet on the platform, wherein the airship is configured to be magnetically arrested on the landing platform element by actuation of the electric magnet.

9. The system of claim 8, wherein the landing platform element is rotatable about a rotary axis relative to the ground element.

* * * * *